US007917862B2

(12) United States Patent
Breidenbach et al.

(10) Patent No.: US 7,917,862 B2
(45) Date of Patent: Mar. 29, 2011

(54) SYSTEM AND METHOD FOR IMPROVING THE PERFORMANCE OF A PLURALITY OF PERIPHERAL DEVICES

(75) Inventors: Steven T. Breidenbach, San Diego, CA (US); Michael L Rudd, Fort Collins, CO (US); Michelle R. Lehmeier, Loveland, CO (US); Thomas R Mitchell, Laporte, CO (US); K Douglas Gennetten, Ft Collins, CO (US); Brian J. Brown, Fort Collins, CO (US); Jerlyn R Culp, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1996 days.

(21) Appl. No.: 10/046,347

(22) Filed: Oct. 26, 2001

(65) Prior Publication Data

US 2003/0084085 A1 May 1, 2003

(51) Int. Cl.
*G06F 3/048* (2006.01)
(52) U.S. Cl. ...................................... 715/771; 715/970
(58) Field of Classification Search .................. 345/714, 345/734, 764, 775; 358/1.6; 715/771, 970
See application file for complete search history.

(56) References Cited

U.S. PATENT DOCUMENTS

| 5,231,663 | A | | 7/1993 | Earl et al. |
| 5,235,674 | A | | 8/1993 | Cohen-Skalli et al. |
| 5,859,710 | A | * | 1/1999 | Hannah ......................... 358/296 |
| 6,091,508 | A | * | 7/2000 | Love et al. .................... 358/1.15 |
| 6,452,695 | B1 | * | 9/2002 | Casey et al. .................... 358/1.6 |
| 6,789,111 | B1 | * | 9/2004 | Brockway et al. ............. 709/222 |

FOREIGN PATENT DOCUMENTS

| EP | 0756414 A2 | 1/1997 |
| EP | 1162820 A2 | 12/2001 |
| WO | WO 99/55534 | 11/1999 |

OTHER PUBLICATIONS

"Wirless Networks". May 27, 1995: p. 1 [Online] Available http://www.cc.gatech.edu/fce/hardware/wireless/wireless.html Sep. 15, 2004.*

* cited by examiner

*Primary Examiner* — Namitha Pillai (57) ABSTRACT

A system for improving the performance of a plurality of peripheral devices is disclosed. In one embodiment, the invention comprises a first peripheral device associated with a first software component and having a first functionality, and a second peripheral device associated with a second software component and having a second functionality, the second peripheral device being coupled to the first peripheral device, the first and second peripheral devices together performing functionality in addition to the first and second functionalities and having a common user interface.

18 Claims, 6 Drawing Sheets

SYSTEM AND METHOD FOR IMPROVING THE PERFORMANCE OF A PLURALITY OF PERIPHERAL DEVICES

BACKGROUND OF THE INVENTION

1. Field of the Invention

The present invention relates generally to peripheral devices, and, more particularly, to a system and method for improving the performance of a plurality of peripheral devices.

2. Related Art

Personal computers, scanners, printers, digital cameras, mass storage devices, and other electronic devices are readily available to the average consumer. One or more of these electronic devices may be connected directly to a computer, or may be connected to each other via a network. Such a network may be a local area network (LAN), such as that used in an office or a home to connect a number of computers, printers, copy machines, fax machines, etc., or may be a wide area network, such as the Internet.

Regardless of the manner in which connected, these peripheral devices typically each have one major type of functionality and user interface. For example, a scanner is generally capable of developing electronic representations of documents, while a printer is generally capable of printing images. Furthermore, a significant amount of user interaction is typically required to maximize the functionality of each of the peripheral devices. For example, each peripheral device may include its own software, which may require the adjustment of many parameters, both manual and via electronic interface with the device, to maximize the operability of the peripheral device.

SUMMARY

In architecture, a system for improving the performance of a plurality of peripheral devices is disclosed, comprising a first peripheral device associated with a first software component and having a first functionality, and a second peripheral device associated with a second software component and having a second functionality, the second peripheral device being coupled to the first peripheral device, the first and second peripheral devices together performing functionality in addition to the first and second functionalities and having a common user interface.

The invention can also be conceptualized as a method for improving the functionality of a plurality of peripheral devices comprising the steps of providing a first peripheral device associated with a first software component and having a first functionality, coupling a second peripheral device associated with a second software component and a second functionality to the first peripheral device, and where the first and second peripheral devices together perform functionality in addition to the first and second functionalities and have a common user interface.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

According to the teachings of the present invention, the system for combining peripheral devices for additional functionality can be implemented in software (e.g., firmware), hardware, or a combination thereof. In one embodiment, the system for combining peripheral devices is implemented in a configuration in which a plurality of peripheral devices are coupled to a computer, such as a personal computer (PC), and the invention is implemented using primarily software. In another embodiment, a plurality of peripheral devices is connected over a network and the innovative system for combining peripheral devices is implemented using a combination of software and hardware. Furthermore, the system for combining peripheral devices can be implemented in a home network environment using, for example, a set-top box to which are connected one or more peripheral devices, such as webpads, home control centers, etc. The term "webpad" is used to refer to any portable device that enables a user to navigate the Internet without a conventional computer. A "home control center" is a processing device that can connect to a LAN or a WAN and that controls various functions in a home. Such a home control center may, for example, control the environmental systems and the security system in a home and may be remotely accessible via, for example, the Internet. Regardless of the manner of implementation, the software portion of the invention can be executed by a special or general purpose computer, such as a personal computer (PC: IBM-compatible, Apple-compatible, or otherwise), workstation, minicomputer, or mainframe computer.

Figure 1:
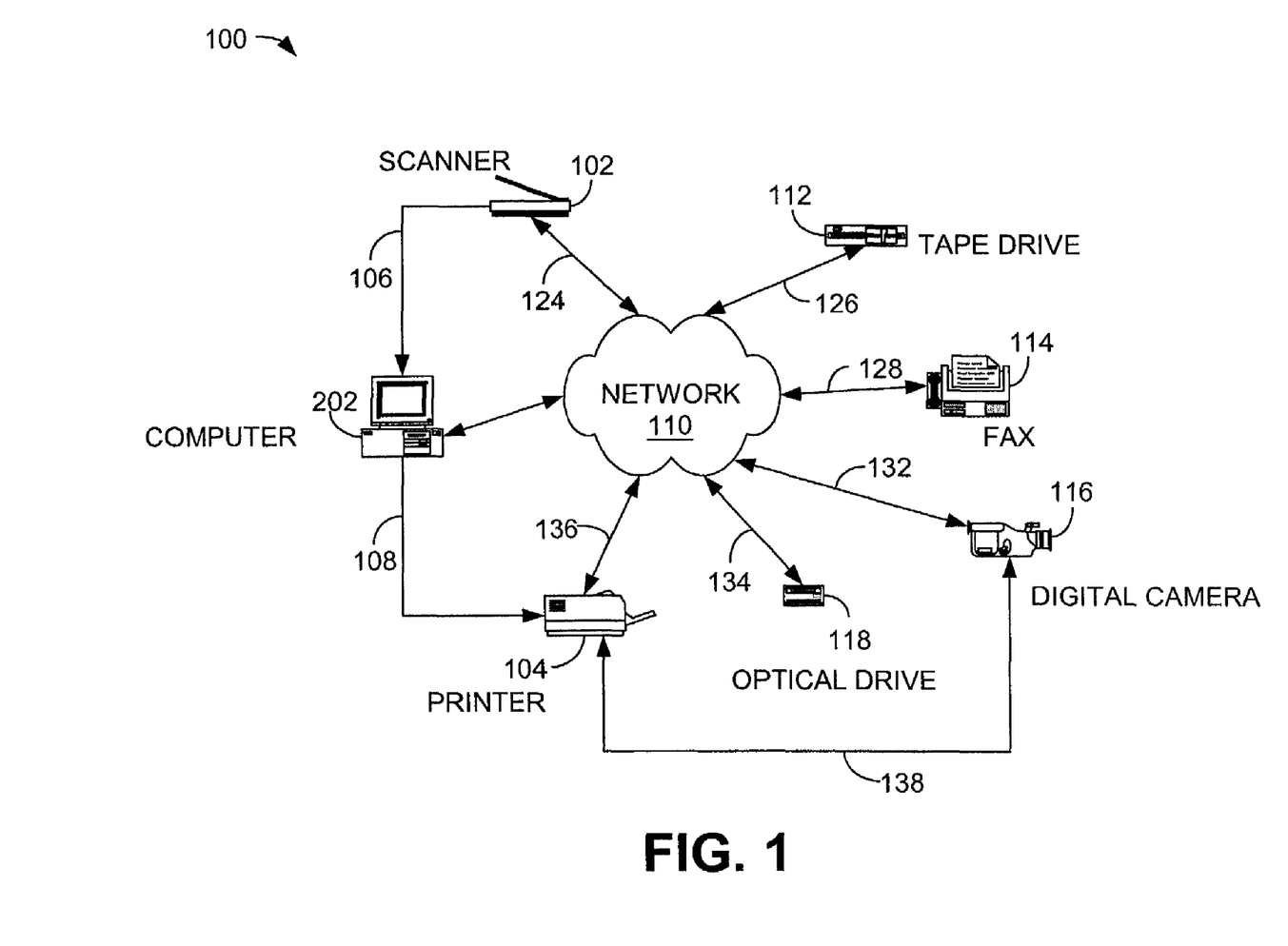
FIG. 1 is a schematic view illustrating an exemplar environment in which the invention resides.

FIG. 1 is a schematic view illustrating an exemplar environment 100 in which the invention preferably resides. As mentioned above, in one embodiment, the innovative system for combining peripheral devices is implemented primarily in software using a computer 202 to which a plurality of peripheral devices is connected. For example, a scanner 102 and a printer 104 can be directly connected to the computer 202 via connections 106 and 108 respectively. Typically, the scanner 102 will scan an image, create an electronic representation of the image, and transfer the electronic representation of the image to the computer 202. The computer will store the electronic representation of the image in a suitable image format. Typically, the scanner 102 will include a software component that is loaded onto and executed by the computer 202 to allow the scanner 102 to operate. Similarly, the printer 104 will also include a software component that is installed on and executed by the computer 202 so that the computer 202 can send a file to the printer 104 for printing.

In one embodiment, the system for combining peripheral devices includes in the software associated with, for example, the scanner 102 and the printer 104, a component that allows the computer 202 to search for and identify compatible peripheral devices. Once these compatible peripheral devices are identified by the computer 202, the computer 202 determines the functionality available from each peripheral device and then determines the total functionality available from all the identified peripheral devices. This total functionality is then presented to a user of the computer 202 via a graphical user interface (GUI). For example, if the computer 202 detects that a scanner 102 and printer 104 are connected as shown in FIG. 1, then the software in the computer may also determine that the functionality of the scanner 102 and printer 104 may be combined to offer a copy function. This additional functionality is then presented to the user of the system. Alternatively, software residing on each peripheral device may determine the total functionality available from all the peripheral devices.

In an alternative embodiment, the invention comprises a plurality of peripheral devices connected to a network 110 or connected directly to each other. The network 110 may be a local area network (LAN), such as an office network, or may be a wide area network (WAN), such as the Internet. Furthermore, the network 110 may be a wireless network. In this embodiment, the scanner 102 and the printer 104 are connected to the network 110 via connections 124 and 136, respectively.

The system also may include a tape drive 112, a fax machine 114, a digital camera 116, and an optical drive 118 connected to the network via connections 126, 128, 132 and 134, respectively. Further, the peripheral devices may be connected directly to each other. For example, the printer 104 may be coupled directly to the digital camera 116 via connection 138.

As mentioned above, the connections 124, 126, 128, 132, 134, 136 and 138 may be conventional wired connections or may be wireless connections. In this embodiment of the system for combining peripheral devices, each peripheral device includes hardware and software for allowing the device to communicate over the network 110 with all other similarly equipped, and compatible, devices. For example, the scanner 102 includes an automatic recognition logic element (to be described below) that, when connected to the network 110 or directly to another peripheral device, automatically queries all devices on the network to determine whether there are any similar compatible devices. The scanner 102 sends a communication packet over the network announcing its presence and seeking other similar class devices. Another device on the network 110, such as the printer 104, recognizes the query sent by the scanner 102 and responds with a communication packet including its identity and capabilities. In this manner, the scanner 102 can recognize like class elements and can automatically configure its functionality based on the identity and capability of other network elements. In such an embodiment, software residing on each peripheral device is capable of determining the total functionality available from all peripheral devices connected to the network.

Figure 2:
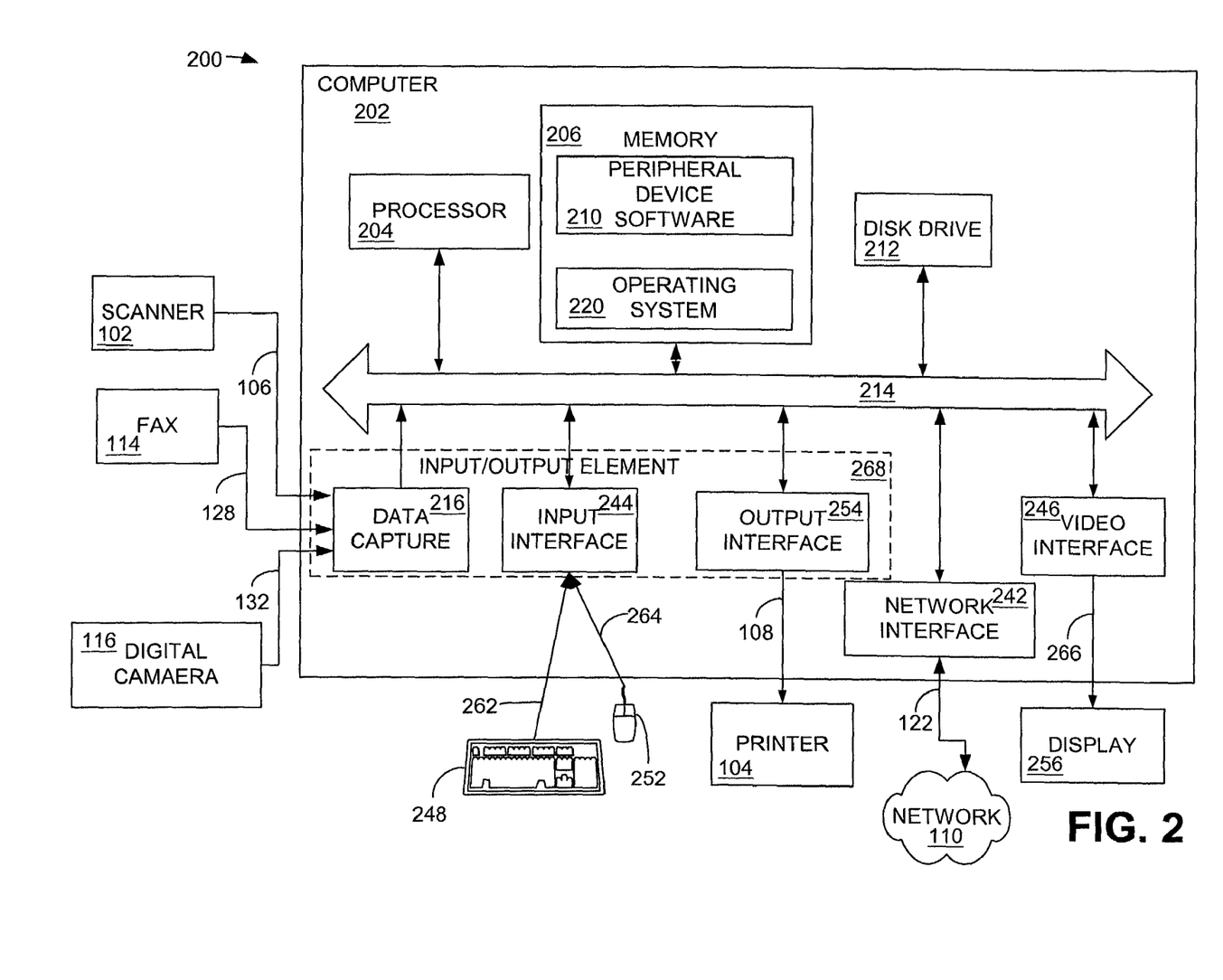
FIG. 2 is a block diagram illustrating an exemplar peripheral device and computer system that includes the general purpose computer of FIG. 1.

An example of a general purpose computer that can implement the software of the first embodiment of the system for combining peripheral devices is shown in FIG. 2.

FIG. 2 is a block diagram illustrating an exemplar peripheral device and computer system 200 that includes the general purpose computer 202 of FIG. 1. The computer 202 can implement the peripheral device software 210. The peripheral device software 210 and other software and hardware elements (to be discussed with respect to FIG. 2) work in unison to implement the functionality of the invention. Generally, in terms of hardware architecture, as shown in FIG. 2, the computer 202 comprises a processor 204, memory 206, a disk drive 212, an input interface 244, a video interface 246 and an output interface 254 that are connected together and can communicate with each other via a local interface 214. The local interface 214 can be, for example but not limited to, one or more buses or other wired or wireless connections, as is known to those having ordinary skill in the art. The local interface 214 may have additional elements, which are omitted for simplicity, such as buffers (caches), drivers, and controllers, to enable communications. Further, the local interface 214 has address, control, and data connections to enable appropriate communications among the aforementioned components.

The processor 204 is a hardware device for executing software that can be stored in memory 206. The processor 204 can be any custom-made or commercially available processor, a central processing unit (CPU) or an auxiliary processor among several processors associated with the computer 202, and a microchip-based microprocessor or a macroprocessor. A suitable processor is any processor that can perform the needed actions to support the functionality of the invention disclosed. Examples of suitable commercially available microprocessors are as follows: a PA-RISC series microprocessor from Hewlett-Packard Company, an 8086 or Pentium series microprocessor from Intel Corporation, a PowerPC microprocessor from IBM Corporation, a Sparc microprocessor from Sun Microsystems, Inc., or a 68xxx series microprocessor from Motorola Corporation.

The memory 206 can include any one or combination of volatile memory elements (e.g., random access memory (RAM, such as DRAM, SRAM, etc.)) and nonvolatile memory elements (e.g., RAM, ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The input interface 244 can receive commands from, for example, keyboard 248 via connection 262 and from mouse 252 via connection 264 and transfer those commands over the local interface 214 to the processor 204 and the memory 206. In accordance with an aspect of the invention, a plurality of peripheral devices is connected to the computer 202. For example, the scanner 102, fax machine 114 and digital camera 116 connect to the data capture element 216 via connections 106, 128 and 132, respectively. The data capture element 216 is part of the input/output element 268 and receives inputs from the connected peripheral devices.

The video interface 246 supplies a video output signal via connection 266 to the display 256. The display 256 can be a conventional CRT based display device, or can be any other display device, such as a liquid crystal display (LCD) or other type of display.

The output interface 254 sends printer commands via connection 108 to the printer 104. The network interface 242, which can be, for example, a network interface card located in the computer 202 or a modulator/demodulator (modem) can be any communication device capable of connecting the computer 202 to an external network 110.

The software in memory 206 may comprise one or more separate programs, each of which further comprises an ordered listing of executable instructions for implementing logical functions. In the example of FIG. 2, the software in the memory 206 contains the peripheral device software 210 and a suitable operating system (O/S) 220. The peripheral device software 210, while illustrated as a single element for simplicity, comprises software for each peripheral device connected to the computer 202. For example, the peripheral device software 210 comprises software for the scanner 102, fax machine 114, digital camera 116 and the printer 104.

The operating system 220 essentially controls the execution of other computer programs, such as the peripheral device software 210, and provides scheduling, input-output control, file and data management, memory management, and communication control and related services. The processor 204 and operating system 220 define a computer platform, for which application programs, such as the peripheral device software 210, in higher level programming languages are written.

The peripheral device software 210 comprises the software that allows the computer 202 to communicate with, detect the presence and capabilities of, modify a user interface based on the detected capabilities, and control the operation of each of the connected peripheral devices. The peripheral device software 210 also preferably has portions of code that are stored and executed in each connected peripheral device. The peripheral device software 210 automatically senses the presence and capabilities of a compatible peripheral device and adjusts the user experience based on the detected capabilities.

A compatible peripheral device is one that is capable of sharing information with a like peripheral device regarding its capabilities. Portions of the peripheral device software 210 that are located on each peripheral device allow each peripheral device to make its capabilities known to the computer 202, and, in an alternative embodiment to be described below, to other peripheral devices that are connected to each other either directly or via a network. Such an arrangement allows the peripheral device software 210 to include a portion of code that is common to all peripheral devices and to include additional portions of code that are specific to each peripheral device. These portions are sometimes referred to as "overlays." These overlays may comprise extended capabilities, such as a basic description of the peripheral device and its capabilities, a graphical image of the peripheral device that can be presented to a user, and tools and extensions that are unique to the peripheral device. Further, in an alternative embodiment, a peripheral device can provide a graphical user interface (GUI) for another peripheral device. It should also be mentioned that, although illustrated using peripheral devices, the concepts of the invention are also applicable to services. For example, such services may include image processing that is accessible using the computer 202 or one of the peripheral devices.

When the computer 202 is in operation, the processor 204 is configured to execute software stored within the memory 206, to communicate data to and from the memory 204 and to generally control operations of the computer 202 pursuant to the software. The peripheral device software 210 and the O/S 220, in whole or in part, but typically the latter, are read by the processor 204, perhaps buffered within the processor 204, and then executed.

When the system for combining peripheral devices is implemented primarily in software, as is shown in FIG. 2, it should be noted that the peripheral devices software 210 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The peripheral device software 210 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The hardware components of the system for combining peripheral devices can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
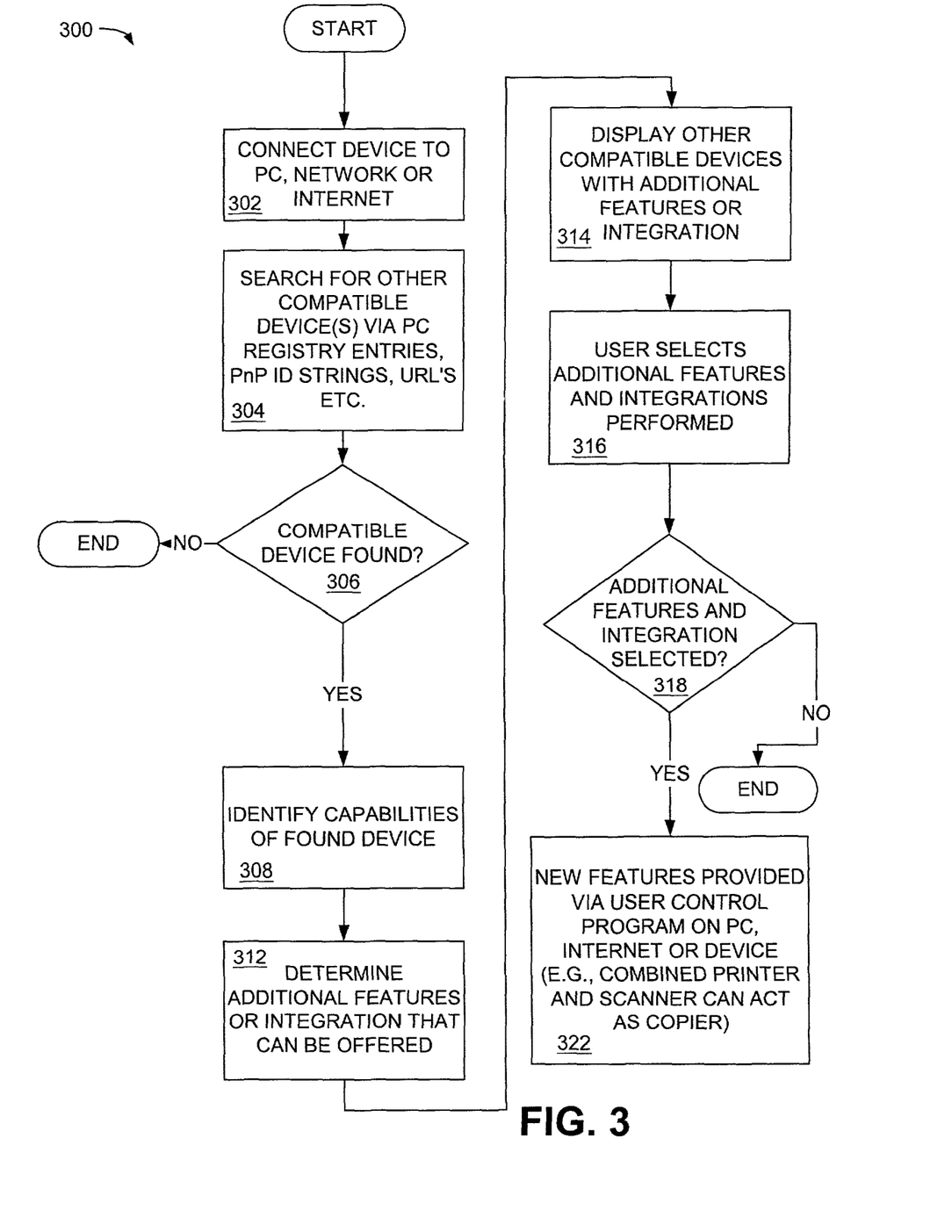
FIG. 3 is a flow diagram illustrating the operation of the embodiment of the invention illustrated in FIG. 2.

FIG. 3 is a flow diagram 300 illustrating the operation of the embodiment of the invention illustrated in FIG. 2. In block 302 a peripheral device, such as the scanner 102 or the printer 104 of FIG. 1, is connected to the computer 202 (FIG. 1). Alternatively, the peripheral device can be connected to the computer 202 via the network 110 (FIG. 1). When each peripheral device is connected to the computer 202, information regarding the identity and capabilities of each connected peripheral device is stored on the computer 202. This information may be stored on the computer 202 in the form of PC registry entries, extensible markup language (XML) based device profiles, plug and play (PnP) identification strings, universal resource locators (URL's) etc., and made available to the other connected peripheral devices.

In block 304, the computer 202 will search for other compatible peripheral devices using the above-identified PC registry entries, etc. During boot up of the computer 202 and the addition of peripheral devices, the user is made aware of the capabilities of the peripheral devices that are already connected to the computer and provided choices as to the available functionality through a common user interface.

Figure 6:
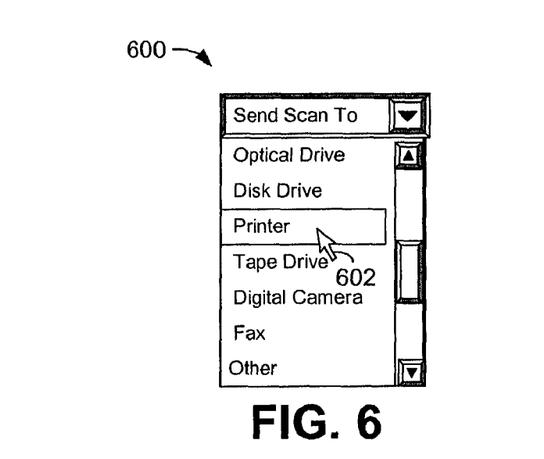
FIG. 6 is a graphical representation of a pull-down style menu used to indicate one of the devices of the invention.

In block 306 it is determined whether a compatible device is found connected to the computer 202. If no compatible device is found, then the process ends. However, if a compatible device is located by the computer 202, then, in block 308, the computer 202 identifies to the user the capabilities of each identified peripheral device. This may be accomplished using, for example, a GUI that presents a pull-down style menu (shown below in FIG. 6) to the user of the computer 202. Alternatively, the compatible device may provide a visual component for automatic extension of a GUI "control center" (shown below in FIGS. 7A and 7B). For example, the compatible device may provide a button, or other suitable graphic indicator, and an illustration that represents the appearance of the compatible device. In such an implementation, the user may choose the compatible device by selecting the pictorial representation of the device. Further, when compatible devices are found, they may either be "off-line" or "on-line." An "off-line" device is one that is connected to the system, but not available for use. An "on-line" device is one that is connected to the system and available for use. The above-described visual indicator of the device can indicate to the user whether the compatible device is on-line or off-line.

In block 312 the computer determines whether any additional features or integration can be offered to the user based on the capabilities of the detected peripheral devices. Integration refers to the incorporation of the additional functionality in the user interface that is presented to the user, and will be described below. The computer 202 will identify tasks that could not be performed prior to adding an additional peripheral device. For example, if the scanner 102 is added to the computer 202, which already has an attached printer 104, the new scanner 102 and printer 104 combination can enable the user to perform copier tasks. This additional functionality (i.e., the copy task) can be presented to the user of the computer through a graphical user interface. Further, multiple instances of the same device are possible. Such an operational mode is sometimes referred to as "multi-instance co-existence." In "multi-instance co-existence" automatic configuration of multiple instances of the same device is supported. Further, if multiple similar compatible devices (for example, two scanners) are coupled to the system, the system may choose the best default device for a given situation. For example if the user wishes to scan a document, the system may decide which scanner to activate when the user chooses the scan function from the GUI. The system may also include a manual override to allow the user to choose a particular peripheral device.

In block 314 the computer 202 displays to the user other compatible peripheral devices and any additional available features. The complete set of tasks that can be performed by the combination of connected peripheral devices is now presented to the user. Tasks can be selected by the user to customize the user interface and keep unwanted tasks from cluttering the user interface. In block 316 the user selects any additional features that can be performed.

In block 318 it is determined whether any additional features and/or integration of the GUI are selected by the user. If additional features and GUI integration are not selected, then the process ends. If additional features and/or GUI integration is selected in block 318, then, in block 322 the new features are provided to the user via user controlled programs on the computer 202. If software for special tasks is not available on the computer 202, then the user can be informed of the software that can be purchased or rented and then downloaded to assist and enable the user to perform these special tasks.

The peripheral device software 210 (FIG. 2), by having knowledge of other peripheral devices that are connected to the computer 202, can be used to improve the user experience by, for example, providing integrated customer education materials that enable users to quickly learn new tasks and quickly troubleshoot problems. Furthermore, the peripheral device software 210 can be used to provide a single simplified customer registration process, provide a consistent and integrated user interface that enables learning on one task to be transferred to other tasks, and provide a single place to learn task and status information for all peripheral devices that are connected to the computer 202.

Figure 4:
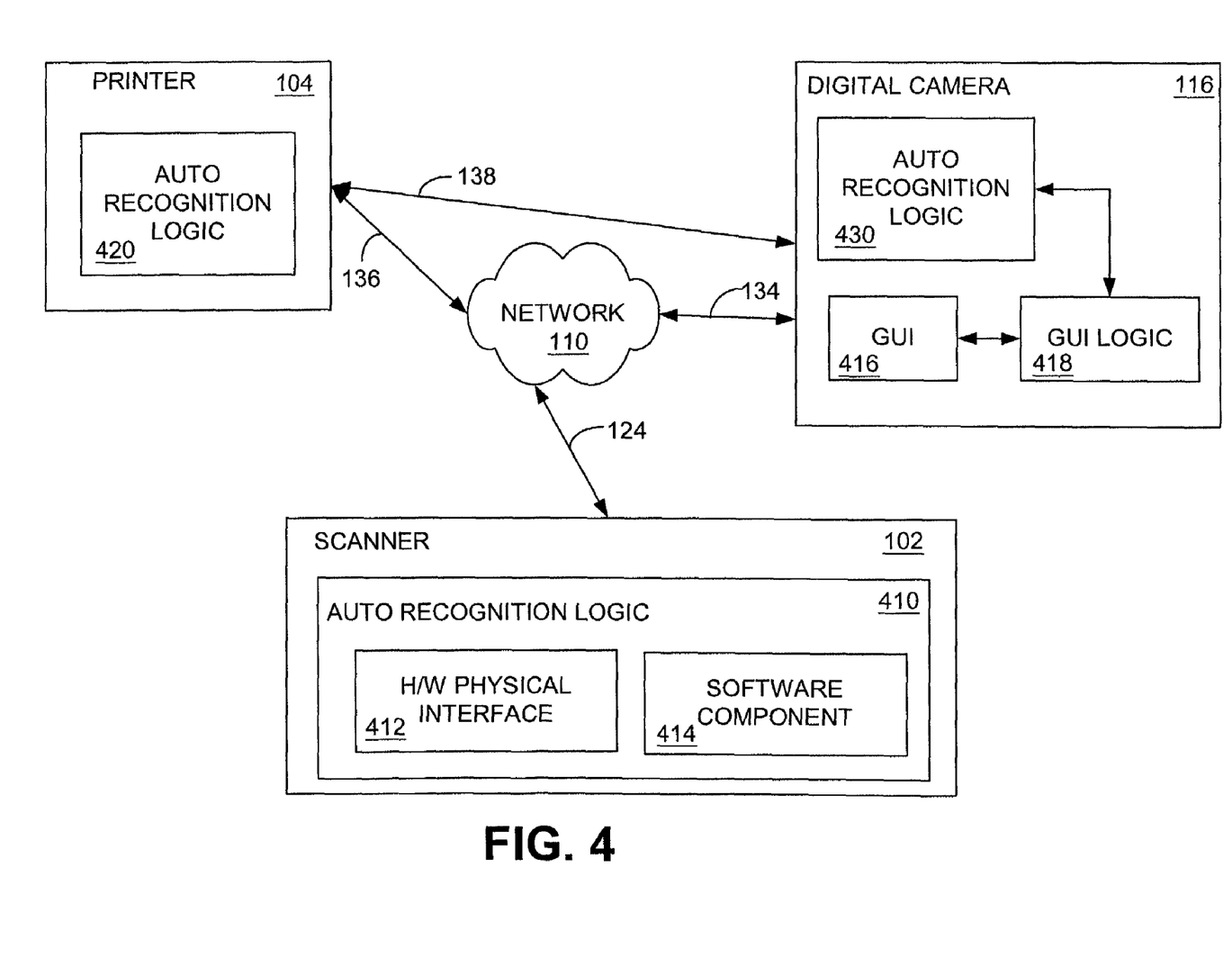
FIG. 4 is a schematic diagram illustrating an alternative embodiment of the system for combining peripheral devices.

FIG. 4 is a schematic diagram illustrating an alternative embodiment of the system for combining peripheral devices. FIG. 4 illustrates the scanner 102, printer 104 and digital camera 116 connected through the network 110 and illustrates the digital camera 116 connected directly to the printer 104 via connection 138. When connected as shown in FIG. 4 (without a computer 202), each of the peripheral devices include automatic recognition logic. The scanner 102 includes automatic recognition logic 410, the printer 104 includes automatic recognition logic 420 and the digital camera 116 includes automatic recognition logic 430. The automatic recognition logic elements 410, 420 and 430 are portions of peripheral device software 210 that reside on each peripheral device and are similar in their functionality and differ only to the extent necessary to allow each peripheral device to function as intended. The automatic recognition logic allows each peripheral device to communicate either via the network 110 or directly with each other, as illustrated by the digital camera 116 and the printer 104.

The automatic recognition logic 410 includes a hardware, or physical, interface 412 and a software component 414. The hardware interface 412 can be any interface for allowing the peripheral device (the scanner 102 in this example) to connect to the network 110 or, in the case of the digital camera 116 and the printer 104, to connect to each other. As mentioned above, because the network 110 may be any of a number of different wired and wireless networks, the hardware interface 412 can be any physical interface that allows the desired connectivity. For example, if the network 110 is a wireless network, then the hardware interface 412 may be an infrared (IR) transceiver designed to communicate with a corresponding IR transceiver (not shown) connected to the network 110. The hardware interface (not shown) in the digital camera 116 and the printer 104 are similarly configured.

The software component 414 includes functionality to allow the peripheral device (scanner 102) to construct and transmit a communication packet including self-identification and capability information over the network 110, or if directly connected, to another peripheral device. The software component 414 also includes functionality for the peripheral device 102 to receive a communication packet sent by another peripheral device and to respond to the communication packet with information relating to its identity and capability. The software component 414 also includes functionality that enables the peripheral device 102 to dynamically configure and modify its capability and functionality based on information received from other peripheral devices and to construct and modify a GUI presented to a user in accordance with the detected capabilities.

For example, when the digital camera 116 is connected directly to the printer 104, or if the digital camera 116 is connected to the printer 104 via the network 110 or via the computer 202 of FIG. 2, it may be desirable for the digital camera 116 to function as the GUI for the printer 104. In such a configuration, the automatic recognition logic 430 in the digital camera 116 and the automatic recognition logic 420 in the printer 104 exchange information regarding each peripheral devices' capabilities. This information is presented to a user of the digital camera 116 and the printer 104 via, in this example, via a GUI 416 located on the digital camera 116. In this example, the digital camera 116 includes a display and provides the GUI for the printer 104. The GUI logic 418 couples to the automatic recognition logic 430 to learn the capabilities of the printer 104 and present to the user of the system any extended capabilities available from the combination of the digital camera 116 and the printer 104.

Figure 5:
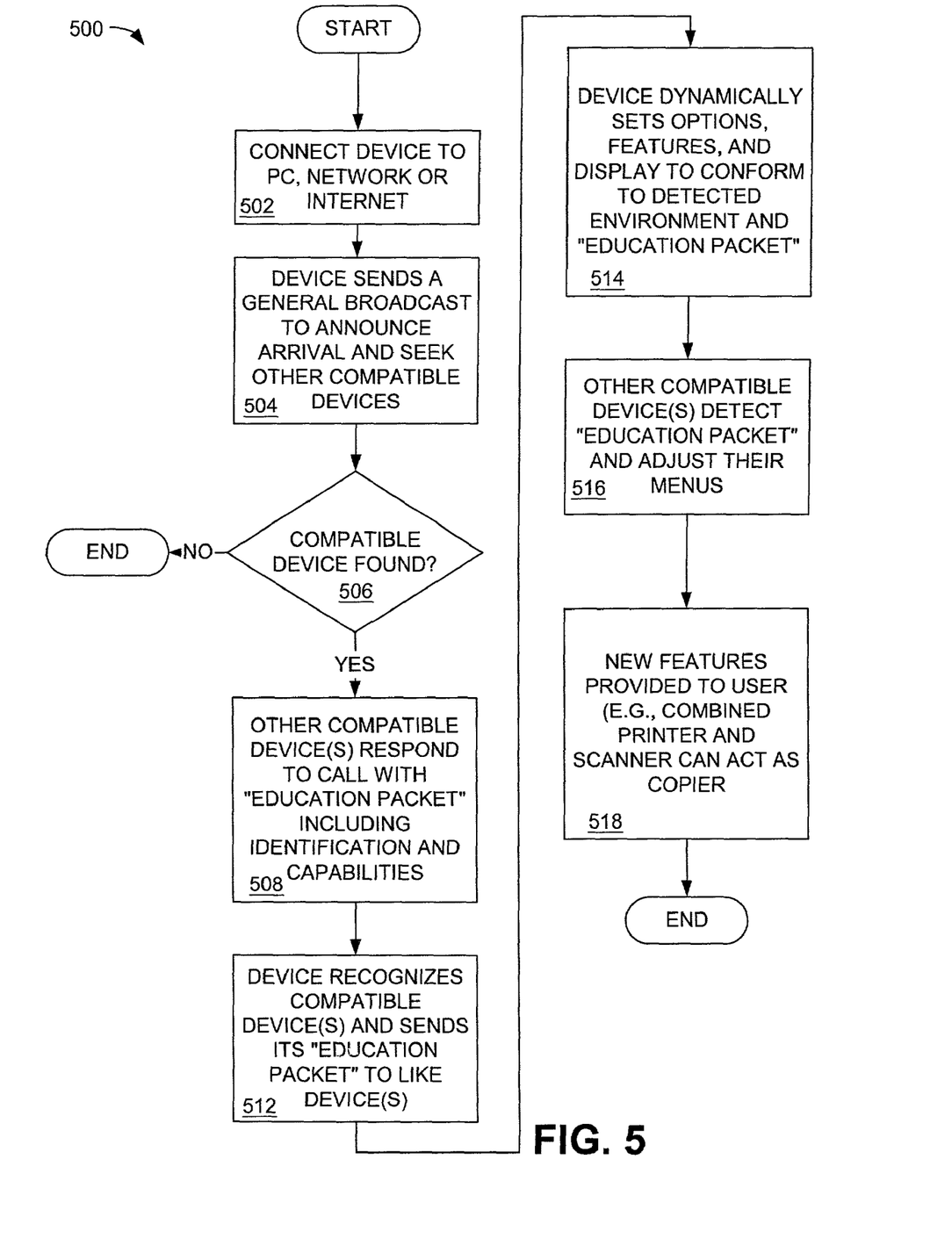
FIG. 5 is a flow diagram illustrating the operation of the embodiment of the invention illustrated in FIG. 4.

FIG. 5 is a flow diagram 500 illustrating the operation of the embodiment of the invention illustrated in FIG. 4. In block 502 a peripheral device, such as scanner 102, is connected to the network 110. It should be noted that in this embodiment, the network 110 is a bi-directional communication network (using for example, transmission control protocol/Internet protocol (TCP/IP) as the communication protocol) so that each peripheral device can communicate directly with any other peripheral device connected to the network 110. Typically, each peripheral device will be assigned a unique network address so that it may be accessed by any other peripheral device coupled to the network 110. Further, the following description is also applicable to an arrangement in which two devices are coupled directly to each other.

In block 504 a newly connected peripheral device (scanner 102) develops and transmits a general broadcast message to announce its arrival on the network 110 and seek other compatible peripheral devices.

In block 506 it is determined whether the scanner 102 has discovered any other compatible peripheral devices. If not, then the process ends. However, if there is another compatible peripheral device connected to the network 110, then, in block 508 the compatible peripheral device will respond to the general broadcast sent by the scanner 102 with a communication message including information representing the identity and capabilities of the compatible peripheral device. This response can be referred to as an "education packet." In block 512 the newly-connected peripheral device (scanner 102) receives the education packet from the compatible peripheral device and sends its own education packet over the network 110 for receipt by any other compatible peripheral device.

In block 514 the scanner 102 automatically and dynamically adjusts its options, features and display (if applicable) to best take advantage of the detected environment, in response to the education packet received from any other compatible peripheral device. In this manner, the scanner 102 can automatically adjust its functionality based on the functionality of other compatible peripheral devices connected to the network 110. In block 516 other compatible devices connected to the network detect the education packets and accordingly adjust their menus.

In block 518 any new features that are available because of the combination of connected peripheral devices are made available to a user. For example, the combination of a printer 104 and scanner 102 allow a copier function to be performed, and such copy functionality is now made available to a user through a user interface, such as a pull-down menu, associated with any of the peripheral devices. Alternatively, a computer 202 (FIG. 1) can be connected to the network 110 and present the graphical user interface to a user of the system.

To illustrate an example, assume that a scanner 102 is connected to the network 110. Assume also that a printer 104 and an optical drive 118 are also connected to the network. After the exchange of education packets as mentioned above, the scanner 102 may present to a user through the scanners display (not shown) or through a user interface presented on a computer, a menu selection on a display associated with the scanner. Such a menu may be in the form of a pull-down style menu such as that shown in FIG. 6 and illustrated using reference numeral 600. The menu 600 may include choices regarding the ability to deliver a scanned image to any of the peripheral devices connected to the network 110. For example, in the menu illustrated in FIG. 6, the user has indicated using pointer 602 that the scanned image should be delivered directly to the printer 104. Furthermore, assuming for example purposes that the printer is a black and white printer having both paper and transparencies loaded and is located at network address 00.03.05, then a message can be presented on the display of the scanner 102 that informs the user that, for example, "you have selected printer 00.03.05. Would you like to print on paper or transparency?" Furthermore, in this example, the scanner 102 detects that it is attached only to a printer capable of printing in black and white. Therefore, the scanner would not scan in color, but only in black and white, resulting in an improvement in performance that can be visible to the user.

As another example, assume that the scanner 102 is a color scanner that is coupled to the printer 104, which, in this example, is a color printer. Assume also that a user wishes to duplicate a lengthy document in black & white. Any automatic configuration to scan & print in color would be slow and wasteful. In such an instance, either manual override, or semiautomatic override (perhaps based on prescanning the first or first few pages) would enable high speed black & white duplication even though the scanner 102 and printer 104 are capable of color reproduction.

Further still, the peripheral device could determine the speed at which data is traversing the network 110 and set parameters based on the detected speed. For example, the scanner 102 could detect that the network 110 is congested and operating slowly, and then automatically compress the scanned document before sending the document to the printer 104.

Figure 7A:
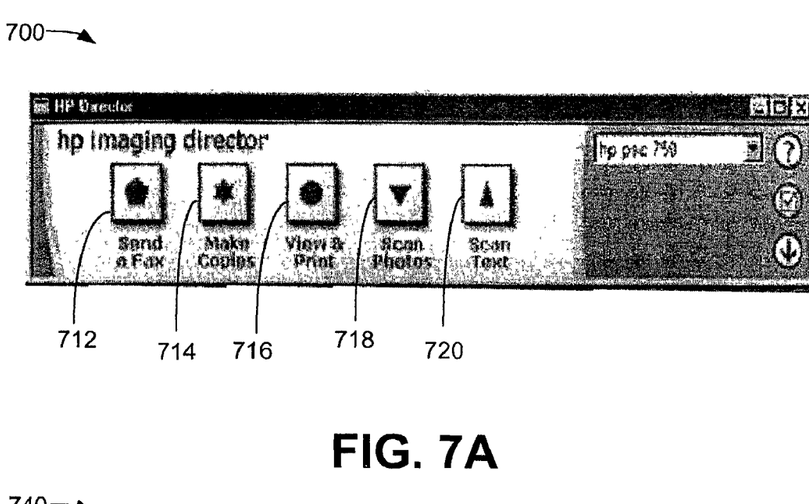
FIGS. 7A and 7B are graphical representations collectively illustrating a GUI presented to a user.
Figure 7B:
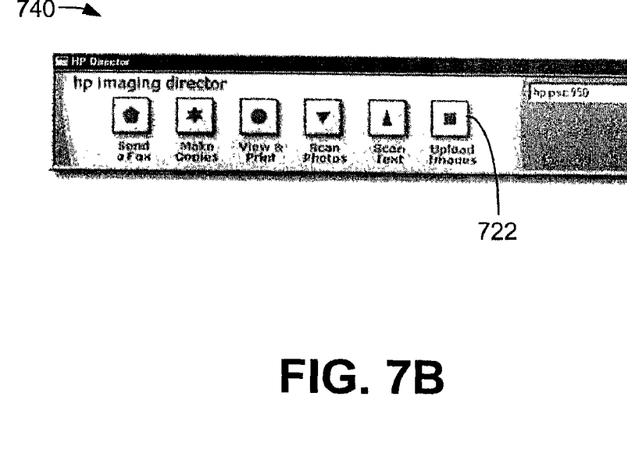

FIGS. 7A and 7B are graphical representations collectively illustrating a GUI presented to a user. FIG. 7A is a graphical representation 710 of a GUI presented to a user of the system. In FIG. 7A, the GUI 710 includes a number of buttons that represent functionality available to the user. The functionality available to the user is represented to the user of the system by a fax button 712, copy button 714, print button 716, scan photo button 718 and scan text button 720.

FIG. 7B is a graphical representation 740 of a GUI presented to a user of the system after additional functionality has been added. In FIG. 7B, the GUI 740 now includes an upload images button 722, thus indicating that a digital camera has been added to the system and the functionality of the digital camera recognized and added to the GUI 740.

What is claimed is:

1. A system for improving the performance of a plurality of peripheral devices, comprising:
    a first peripheral device comprising a first software component and having a first functionality; and
    a second peripheral device coupled to the first peripheral device via a network, the second peripheral device comprising a second software component and having a second functionality, the second peripheral device being coupled to the first peripheral device without being directly connected to an intermediate computing device positioned along the communication path between the peripheral devices, the first and second peripheral devices together performing a third functionality in addition to the first and second functionalities;
    wherein the first peripheral device comprises a peripheral device display on which can be presented a graphical user interface that presents the third functionality to a user for selection
    wherein the first software component of the first peripheral device and the second software component of the second peripheral device allow the first and second peripheral devices to exchange information over a network pertaining to the identity of the first peripheral device and the second peripheral device.

2. The system of claim 1, wherein the information exchanged between the first and second peripheral devices further comprises information relating to the capabilities of the first peripheral device and the second peripheral device.

3. The system of claim 2, wherein the first peripheral device modifies its capabilities based on the information received from the second peripheral device.

4. The system of claim 2, wherein the first peripheral device presents to a user with the graphical user interface a menu of available functionality based on the information received from the second peripheral device.

5. A method practiced by a personal computer (PC) for providing additional functionality from peripheral devices, the method comprising:
 searching for and identifying peripheral devices that are accessible to the PC;
 determining the capabilities of each identified peripheral device using the PC; and
 presenting to the user with the PC a functionality that is available through combination of the capabilities of the identified peripheral devices, the functionality being a functionality that is not independently provided by the identified peripheral devices.

6. The method of claim 5, wherein determining the capabilities of the identified peripheral devices comprises automatically querying all peripheral devices on a network to which the PC is connected.

7. The method of claim 6, wherein determining the capabilities of the identified peripheral devices further comprises receiving information from peripheral device software provided on each identified peripheral device.

8. The method of claim 5, further comprising storing information about the peripheral device capabilities in a registry of the PC.

9. The method of claim 5, wherein presenting a functionality to the user comprises presenting the functionality to the user with a graphical user interface (GUI) on a display associated with the PC.

10. The method of claim 9, wherein the GUI comprises a pull-down menu.

11. The method of claim 9, wherein the GUI displays the complete set of tasks that can be performed through combination of the capabilities of the identified peripheral devices.

12. The method of claim 5, wherein presenting a functionality to the user comprises presenting a copying functionality that is available due to a scanning capability of a scanner and a printing capability of a printer.

13. A personal computer (PC), comprising:
 a processor; and
 memory comprising peripheral device software that is configured to search for and identify peripheral devices, to determine the capabilities of each identified peripheral device using the PC, and to present to a user a functionality that is available through combination of the capabilities of the identified peripheral devices, the functionality being a functionality that is not independently provided by the identified peripheral devices.

14. The PC of claim 13, wherein the peripheral device software is configured to automatically query all peripheral devices on a network to which the PC is connected.

15. The PC of claim 13 wherein the peripheral device software is configured to store information about the peripheral device capabilities in a registry of the PC.

16. The PC of claim 13, wherein the peripheral device software is configured to present the functionality to the user with a graphical user interface (GUI) on a display associated with the PC.

17. The PC of claim 16, wherein the GUI displays the complete set of tasks that can be performed through combination of the capabilities of the identified peripheral devices.

18. The PC of claim 13, wherein the peripheral device software is configured to present a copying functionality that is available due to a scanning capability of a scanner and a printing capability of a printer.

* * * * *